(12) United States Patent
Lopez

(10) Patent No.: US 7,698,378 B2
(45) Date of Patent: Apr. 13, 2010

(54) SERVICE DIVERSITY FOR COMMUNICATION SYSTEM

(75) Inventor: Ricardo Jorge Lopez, San Marcos, CA (US)

(73) Assignee: QUALCOMM Incorporated, San Diego, CA (US)

( * ) Notice: Subject to any disclaimer, the term of this patent is extended or adjusted under 35 U.S.C. 154(b) by 208 days.

(21) Appl. No.: 11/196,232

(22) Filed: Aug. 2, 2005

(65) Prior Publication Data
US 2006/0031554 A1 Feb. 9, 2006

Related U.S. Application Data

(63) Continuation of application No. 10/283,876, filed on Oct. 29, 2002, now abandoned.

(51) Int. Cl.
*G06F 15/16* (2006.01)

(52) U.S. Cl. .................. 709/217; 709/218; 709/219; 709/230; 709/231; 709/232; 709/239; 707/10

(58) Field of Classification Search ......... 709/230–232, 709/239, 217, 218, 219; 707/10
See application file for complete search history.

(56) References Cited

U.S. PATENT DOCUMENTS

| | | | |
|---|---|---|---|
| 5,828,843 A | | 10/1998 | Grimm et al. |
| 5,886,733 A | * | 3/1999 | Zdepski et al. ............ 725/64 |
| 5,991,302 A | | 11/1999 | Berl et al. |
| 5,999,985 A | | 12/1999 | Sebestyen |
| 6,065,050 A | | 5/2000 | DeMoney |
| 6,094,439 A | | 7/2000 | Krishna |
| 6,304,902 B1 | | 10/2001 | Black et al. |
| 6,377,562 B1 | | 4/2002 | Schneider |
| 6,426,960 B2 | | 7/2002 | Antonio |
| 6,453,073 B2 | * | 9/2002 | Johnson ..................... 382/239 |
| 6,475,090 B2 | | 11/2002 | Roelofs |
| 6,490,250 B1 | | 12/2002 | Hinchley et al. |
| 6,496,851 B1 | | 12/2002 | Morris et al. |
| 6,643,655 B2 | * | 11/2003 | Oashi et al. ................ 707/10 |

(Continued)

FOREIGN PATENT DOCUMENTS

| | | |
|---|---|---|
| CN | 1266518 | 8/2003 |
| EP | 0869695 | 10/1998 |
| WO | 97042719 | 11/1997 |

OTHER PUBLICATIONS

International Search Report - PCT/US03/033902 - ISA/US - May 5, 2004.
International Preliminary Examination Report - PCT/US03/033902 - IPEA/US - Apr. 1, 2005.

*Primary Examiner*—Liangche Alex Wang
(74) *Attorney, Agent, or Firm*—Milan Patel; Steven R. Thiel

(57) ABSTRACT

A communication transaction or use case is broken down into constituent parts, one of which can be provided, at the direction of a master service node, from the master service node or primary service path and the other of which can be provided from a support service node or secondary service path that the client station might happen to be able to communicate with. For instance, the base layer of a multimedia stream might be provided from the master node, but if its bandwidth becomes full, an enhancement layer of the stream can be provided by the support node, as directed by the master node.

56 Claims, 1 Drawing Sheet

U.S. PATENT DOCUMENTS

| | | | |
|---|---|---|---|
| 6,676,521 B1 | 1/2004 | La Mura et al. | |
| 6,728,775 B1 * | 4/2004 | Chaddha | 709/231 |
| 6,928,087 B2 * | 8/2005 | Slowe et al. | 370/477 |
| 6,968,005 B2 * | 11/2005 | Hannuksela | 375/240.01 |
| 7,191,462 B1 * | 3/2007 | Roman et al. | 725/98 |
| 7,310,628 B2 * | 12/2007 | Sugimoto et al. | 707/3 |
| 7,320,134 B1 * | 1/2008 | Tomsen et al. | 725/32 |
| 2001/0019630 A1 * | 9/2001 | Johnson | 382/232 |
| 2001/0051998 A1 * | 12/2001 | Henderson | 709/217 |
| 2002/0062338 A1 * | 5/2002 | McCurley et al. | 709/203 |
| 2002/0107850 A1 * | 8/2002 | Sugimoto et al. | 707/3 |
| 2002/0133491 A1 * | 9/2002 | Sim et al. | 707/10 |
| 2003/0163551 A1 * | 8/2003 | Riordan | 709/219 |
| 2004/0030797 A1 * | 2/2004 | Akinlar et al. | 709/232 |
| 2004/0081198 A1 * | 4/2004 | Gardner et al. | 370/468 |
| 2007/0113261 A1 * | 5/2007 | Roman et al. | 725/134 |

* cited by examiner

SERVICE DIVERSITY FOR COMMUNICATION SYSTEM

CLAIM OF PRIORITY UNDER 35 U.S.C. §120

The present Application for Patent is a Continuation of patent application Ser. No. 10/283,876 entitled "Source Diversity for Communication System" filed Oct. 29, 2002, now abandoned, and assigned to the assignee hereof and hereby expressly incorporated by reference herein.

BACKGROUND

1. Field

The present invention relates generally to computer-based communication systems.

2. Background

Nodes such as server platforms, client stations, peer stations, and intermediate station nodes in current communication systems typically must select a single channel or single link or other communication interface incident to undertaking a data transfer transaction or a so-called "use case" (essentially, one or more transactions or constituent use cases directed to a common goal), such as the wireless transmission of multimedia data or the downloading of a Web page. This is so even though the nodes themselves might be capable of communicating over a number of diverse channels or links. Service is typically provided over the single channel or link from a single server.

A service provider, either as server or peer, serving a group of clients or peers with multi-channel/multi-link capabilities establishes connections, assigns resources, and otherwise engages in utilizing finite capacities to serve those clients or peers on an "as come" basis. Such allocation often causes ineffective and/or inefficient use of the overall system resources and capabilities as clients or peers engage and disengage services stochastically. For example, a multicast router allocates link utilization based on the shortest route as multicast members engage in a multicast from various point on the global Internet. As time progresses, the router may experience increasing queuing delay on one or more links, while other available links have available capacity to be used.

Currently, this problem is addressed using what can be thought of as the law of large numbers, which entails reliance on low probability events consuming no more than, say, 5% of the total service time wherein the ineffective/inefficient utilization is of significant impact to overall system performance. Such approaches take advantage of the large number of independent arrivals and departures of service requests relative to the capacity of the single resource being used. For example, backbone routers may handle $10^5$ connections at any moment in time on a single link. These connections are engaged and disengaged at a rate of 100 per second, and last on the order of 10 seconds each, leaving sufficient room for the law of large numbers to provide a comfortable margin.

In the case of providing many types of newer services, however, the present invention recognizes that the above-discussed "law of large numbers" can break down. For instance, providing several wireless client stations with multimedia content typically requires high bandwidth since a great deal of data transmission is entailed, and moreover clients typically remain connected for a substantial period, instead of connecting and disconnecting relatively rapidly as is the case for an ordinary telephone call. Unfortunately the server, a wireless communication system base station in this case, has finite transmission bandwidth. It might be able to provide all client stations within its geographic area with a base level of service, e.g., the base station might have the bandwidth to supply all nearby client stations with the base layer of a multimedia stream, but it might not have sufficient bandwidth, depending on the circumstances, to provide all client stations with enhancement layers of the stream. An adjacent base station might happen to have spare bandwidth at that moment, but even if some of the client devices are close enough to it to receive data from the adjacent base station, present protocols permit only the transfer of the entire service between base stations. They do not permit load sharing among base stations to deliver different parts of the same service simultaneously. Having made these critical observations, the invention disclosed herein is provided.

SUMMARY OF THE INVENTION

A transaction or use case makes use of a procedure and a protocol (both as programmatic interface and information stream structure) such that altering the underlying resource allocation that serves the transaction or use case is easily accommodated without any discontinuity of service.

With more specificity, a communication system includes first and second service nodes and a client station positioned to communicate with the service nodes over respective first and second channels. The first service node provides a first part of a use case to the client station and the second service node provides a second part of the use case to the client station simultaneously with the provision of the first part by the first service node. The first and second parts do not represent the same data as each other.

In one non-limiting example, the first part is a base layer of a multimedia stream and the second part is an enhancement layer of the multimedia stream that is associated with the base layer. The client station overlays the enhancement layer onto the base layer to establish frames of the multimedia stream, with each frame including data from the base layer and data from at least one enhancement layer. The channels can be bidirectional.

In another aspect, a method for communication of a single use case to a client station from a service system having at least first and second service resources includes communicating a first part of the use case using the first service resource to the client station, and determining whether to direct the client station to receive a second part of the use case from the second service resource. The first and second parts are different from each other in that the second part is not merely duplicative of the first part. The method also includes selectively directing the client station to receive the second part from the second service resource.

In the preferred method, the first and second parts can be received over respective first and second links. In some implementations, the first service resource is a first server and the second service resource is a second server. In a specific non-limiting embodiment, the first server is a first wireless communication system base station and the second server is a second base station. In this embodiment, the first part can be a base layer of a multimedia stream and the second part can be an enhancement layer of the multimedia stream. The multimedia stream can be digitally broadcast. In another implementation, the first service resource is a first trunk line and the second service resource is a second trunk line. In still another implementation, the first service resource is a satellite providing a base layer of a multimedia stream and the second service resource is a terrestrial resource providing an enhancement layer of the multimedia stream.

In still another aspect, a client station has a first receiver receiving a first part of a use case from a first service resource and a second receiver receiving a second part of the use case from a second resource.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
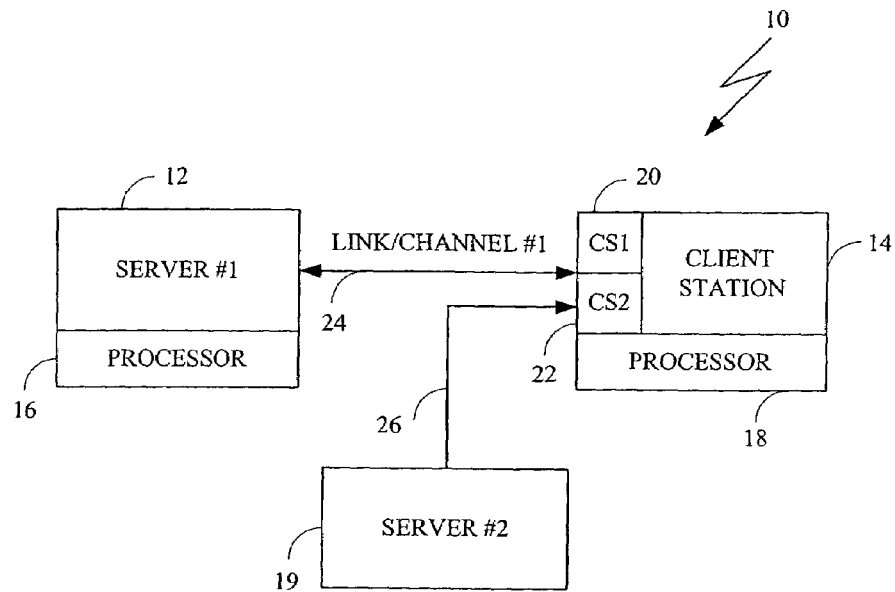
FIG. 1 is a block diagram of a simplified system.

Referring initially to FIG. 1, a system is shown, generally designated 10, that includes plural nodes, such as a first server 12 and a client station 14, although the nodes can be peers in the system 10. The first server 12 has a processor 16 and the client station 14 has a processor 18 for undertaking the communication logic disclosed herein. Also, a second server 19 can establish a node of the system. In one non-limiting exemplary embodiment, the servers 12, 19 might be wireless communication system base stations (BTS). In other embodiments, one or both servers might be routers.

Also, as shown the client station 14 includes at least first and second communication systems 20, 22 for respectively communicating with the servers 12, 19 over respective first and second channels or links 24, 26. That is, the communication systems 20, 22 are configured for communicating over the respective links 24, 26. Thus, if the link 24 is a satellite link, the communication system 20 is a satellite communication system. On the other hand, if the link 26 is a wireless point-to-point link, the communication system 22 is a wireless point-to-point system such as CDMA or GSM. The links 24, 26 (and respective communication systems 20, 22 in the client station 14) may be the same as each other or different from each other. For instance, when one of the servers 12, 19 is a router, the links 24, 26 can be trunk lines. The client station 14 can include additional or different communication systems, such as a 802.11 communication system.

The channels or links 24, 26 may have different class of service (COS) characteristics. For example, the first link 24 can have a higher or lower bandwidth than the second link 26, and/or more or less latency, and/or greater or lesser error quality characteristics, and/or other different COS variables. Non-limiting examples of the types of links or channels to which the invention applies includes wireless communication point-to-point links, UHF/VHF/SHF/EHF broadcast links, landline broadcast links, infrared (IR) links, ethernet links, 802.11 type links, satellite links, etc. A particular COS can be thought of as a class of links that fulfill the service requirements of an application or protocol. Each link 24, 26 may be composed of a receive frequency and a different, transmit frequency.

In one non-limiting embodiment, the client station 14 can be a "mobile station ("MS"), such as a mobile telephone-type device made by Kyocera, Samsung, or other manufacturer that uses Code Division Multiple Access (CDMA) principles and CDMA over-the-air (OTA) communication air interface protocols such as defined in but not limited to IS-95A, IS-95B, WCDMA, IS-2000, and others to communicate with wireless infrastructure, although the present invention applies to GSM, Personal Communications Service (PCS) and cellular systems, such as Advanced Mobile Phone System (AMPS) and the following digital systems: CDMA, Time Division Multiple Access (TDMA), and hybrid systems that use both TDMA and CDMA technologies. A CDMA cellular system is described in the Telecommunications Industry Association/Electronic Industries Association (TIA/EIA) Standard IS-95. Combined AMPS and CDMA systems are described in TIA/EIA Standard IS-95. Other communications systems are described in the International Mobile Telecommunications System 2000/Universal Mobile Telecommunications Systems (IMT-2000/UM), standards covering what are referred to as wideband CDMA (WCDMA), cdma2000 (such as cdma2000 1× or 3× air interface standards, for example) or TD-SCDMA.

The client station 14 may also be a computer that wirelessly access the Internet and/or that access the Internet through a landline.

Figure 2:
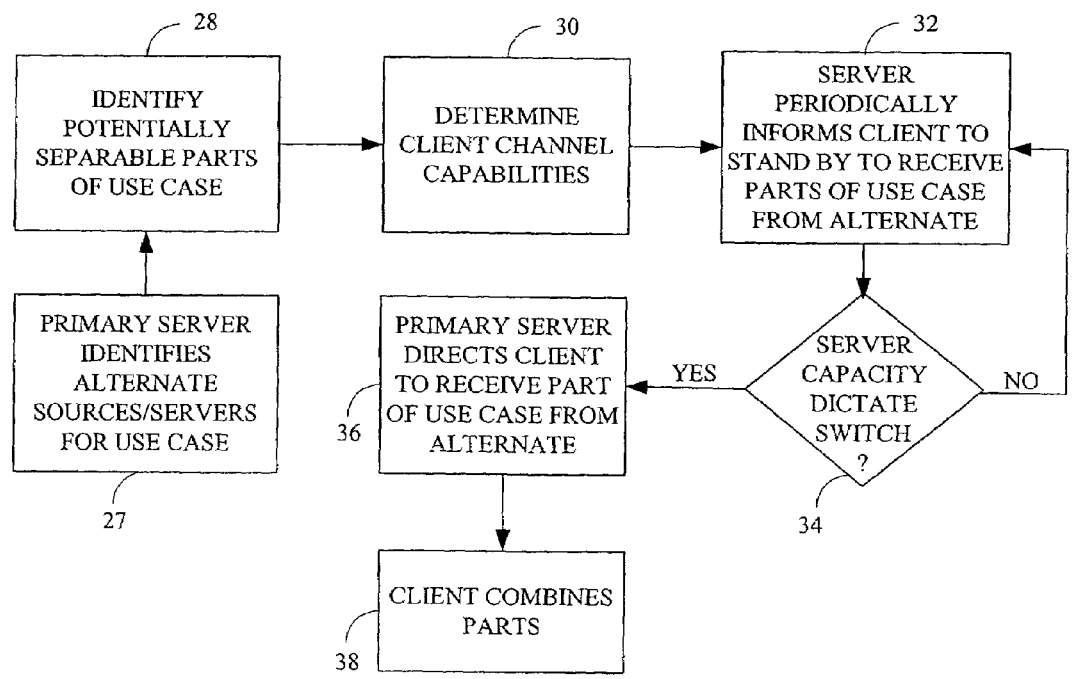
FIG. 2 is a flow chart of the present process.

The process of the present invention can be appreciated in reference to FIG. 2, which can be undertaken using a computer. Commencing at block 27 and assuming that the first server 12 is the server primarily responsible for providing a particular use case to the client station 14, the server 12 identifies an alternate source or server or other service provisioning resource for at least parts of the use case. For example, if the server 12 is a router that intends to route communication to the client station 14 over the first link 24 (in this case, a first trunk line), the server 12 might identify the second link 26 as being a second trunk line over which parts of the use case potentially could be provided. Or, if the server 12 is a wireless communication system BTS providing a digital broadcast multimedia stream to the client station 14 over the first link 24, the server 12 might identify the second server 19 as a BTS that is sufficiently close to the client station 14 that it can provide portions of the multimedia stream to the client station 14 over the second (in this case, wireless) link 26.

Proceeding to block 28, potentially separable parts of the use case are identified. In the context of digital broadcast media, for example, it might be identified that the multimedia stream includes a base layer and one or more enhancement layers. More specifically, some delta prediction schemes such as MPEG4 allow for so-called "enhancement layers" of bits during quantization. Essentially, a "base layer" is provided for each frame for each stream that represents a minimum amount of data necessary to render the frame, with enhancement layers for the frame being available to add fidelity to the image or sound provided by the base layer. The benefit provided by the increased bit rate resulting from the addition of the enhancement layers can be indicated along with the enhancement layers themselves.

In any case, it is to be appreciated that the different parts that are identified at block 28 are not mere duplicates of each other, in contrast to, e.g., transmitting the same wireless data from two base stations to a single wireless receiver to ensure reception of the data. Rather, the first and second part are different parts of the same use case/transaction.

Proceeding to block 30, the capabilities of the client station 14 are determined, to determine whether the client would be able to receive parts of the use case over both links 24, 26. Assuming it can, the logic proceeds to block 32, wherein the server 12 periodically informs the client station 14 to stand by to receive parts of the use case from the alternate source/server. The server 12 may also periodically check the alternate source/server to ensure that it remains available.

In accordance with the present invention, the logic next flows to decision diamond 34, wherein the server 12 determines whether it is at a limit of capacity that requires switching provisioning of parts of the use case to the alternate source/server. When the threshold is reached, the logic moves to block 36, wherein the server 12 directs the client station 14 to receive part of the use case from the alternate source/server. For example, in the context of wireless digital multimedia, at block 36 the client station 12 might receive a base layer of the multimedia stream from the first server 12 (in this, a primary BTS) and simultaneously receive one or more enhancement layers of the same stream from the second server 19 (in this case, a secondary BTS that is sufficiently close to the client station 14 to serve it). In any case, at block 38 the client station 14 combines the parts. For example, in the case of the above-discussed multimedia application, at block 38 the client station 14 would overlay the enhancement layer onto the base layer in accordance with principles known in the art.

As another example, consider a multi-mode mobile multimedia client station device 14 with a terrestrial IxEv-DO link and a L/S/C band Low Earth Orbit (LEO) satellite link. The service provider can broadcast a multimedia base layer over the geographically broader LEO satellite downlink such that all devices within the geographic coverage of the LEO downlink can receive this layer and thus render a base quality of the broadcast media. However, clients desiring additional quality can receive enhancement layers of the multimedia stream over the terrestrial broadcast link. The service provider may choose to limit low count clients of a given cell when bandwidth resources are not available within that cell. The advantage of this use of multiple channels includes reduced bandwidth utilization by many base stations of the same multimedia material and therefore a greater availability of bandwidth for the enhancement layers.

In still another example, the client station 14 may use an RF receiver capable of multiple channel selections, each of which could establish a respective link, e.g., the links 24, 26. Each link is unidirectional. The client station 14 may be directed to obtain one portion of a use case on a first channel and obtain the other portions of the use case on a second channel. The client station 14 can tune transmitting channels independently of receiving channels.

While the particular SERVICE DIVERSITY FOR COMMUNICATION SYSTEM as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. '112, sixth paragraph, unless the element is expressly recited using the phrase "means for" or, in the case of a method claim, the element is recited as a "step" instead of an "act".

What is claimed is:

1. A communication system, comprising:
at least a first service node;
at least a second service node different from the first service node; and
at least one client station positioned to communicate with at least the first and second service nodes over different respective first and second channels, the first service node providing a first part of a use case to the client station, and
the second service node providing a second part of the use case to the client station simultaneously to the first service node providing the first part of the use case to the client station, the first and second parts being different portions of the use case but collectively representing either image or sound data, wherein the first part is a base layer of a multimedia stream and the second part is an enhancement layer of the multimedia stream, wherein the multimedia stream includes at least one of image or sound, wherein the base layer and the enhancement layer collectively represent one, but not both, of image or sound data in the multimedia stream, and wherein the second part adds fidelity to the first part to provide additional quality to a base quality of the respective one of image or sound data provided by the base layer,
wherein the base layer represents an amount of data to render a frame of the multimedia stream with the base quality, and wherein the at least one client station overlays the enhancement layer onto the base layer to establish frames of the multimedia stream with the additional quality, each frame including data from the base layer and data from the enhancement layer.

2. The system of claim 1, wherein at least one channel is bidirectional.

3. The system of claim 1, wherein both channels are bidirectional.

4. The system of claim 1, wherein the service nodes are wireless communication system base stations.

5. The system of claim 1, wherein one of the service nodes is a master node and one of the service nodes is a support node, and the master node directs the client station to receive the second part from the support node when the master node determines that the master node has reached its communication capacity.

6. The system of claim 1, wherein the base layer of the multimedia stream represents a minimum amount of data necessary to render a frame of the multimedia stream.

7. The system of claim 6, wherein the enhancement layer of the multimedia stream provides increased bit rate to add to the fidelity of the image or sound.

8. The system of claim 1, wherein the one of image or sound data comprises image data, wherein the base layer and the enhancement layer represent image data in the multimedia stream, and wherein the enhancement layer adds quality to the base quality of the image data provided by the base layer.

9. The system of claim 1, wherein the one of image or sound data comprises sound data, wherein the base layer and the enhancement layer represent sound data in the multimedia stream, and wherein the enhancement layer adds quality to the base quality of the sound data provided by the base layer.

10. A method for communication of a single use case to a client station from a service system having at least first and second different service resources, comprising:

communicating at least a first part of the use case using the first service resource to the client station, the client station comprising a processor;

directing, by the first service resource, the client station to receive a second part of the use case from the second, different service resource that is sent simultaneous to the communication of the first part of the use case, the first and second parts being different from each other in that the second part is not merely duplicative of the first part, wherein the first and second parts collectively represent either image or sound data, wherein the first part is a base layer of a multimedia stream that includes at least one of image or sound, and the second part is an enhancement layer of the multimedia stream, wherein the base layer and the enhancement layer collectively represent one, but not both, of image or sound data in the multimedia stream, and wherein the second part provides additional quality to a base quality of the respective one of image or sound data provided by the base layer; and in response to the determining act, selectively directing the client station, by the first service resource, to receive the second part from the second service resource, wherein the second part adds fidelity to the image or sound of the first part, the method further comprising overlaying the enhancement layer onto the base layer to establish frames of the multimedia stream with the additional quality, each frame including data from the base layer and data from the enhancement layer.

11. The method of claim 10, wherein the first and second parts are received over different respective first and second links.

12. The method of claim 10, wherein the first service resource is a first server and the second service resource is a second server.

13. The method of claim 12, wherein the first server is a first wireless communication system base station and the second server is a second wireless communication system base station.

14. The method of claim 10, wherein the multimedia stream is digitally broadcast.

15. The method of claim 10, wherein the first service resource is a first trunk line and the second service resource is a second trunk line.

16. The method of claim 10, wherein the first service resource is a satellite and the second service resource is a terrestrial resource.

17. The method of claim 10, wherein the base layer of the multimedia stream represents a minimum amount of data necessary to render a frame of the multimedia stream.

18. The method of claim 17, wherein the enhancement layer of the multimedia stream provides increased bit rate to add to fidelity of the image or sound.

19. The method of claim 10, wherein the one of image or sound data comprises image data, wherein the base layer and the enhancement layer represent image data in the multimedia stream, and wherein the enhancement layer adds quality to the base quality of the image data provided by the base layer.

20. The method of claim 10, wherein the one of image or sound data comprises sound data, wherein the base layer and the enhancement layer represent sound data in the multimedia stream, and wherein the enhancement layer adds quality to the base quality of the sound data provided by the base layer.

21. A client station, comprising:
a first receiver receiving a first part of a use case from a first service resource; and a second receiver receiving a second, different part of the use case from a second, different service resource that is sent simultaneously to the communication of the first part of the use case from the first service resource, wherein the first part is a base layer of a multimedia stream and the second part is an enhancement layer of the multimedia stream, the first and second parts collectively representing either image or sound data, wherein the multimedia stream includes at least one of image or sound, wherein the base layer and the enhancement layer collectively represent one, but not both, of image or sound data in the multimedia stream, and wherein the second part adds fidelity the first part to provide additional quality to a base quality of the respective one of image or sound data provided by the base layer, wherein the first and second parts do not represent the same data as each other, the client station overlaying the enhancement layer onto the base layer to establish frames of the multimedia stream with the additional quality, each frame including data from the base layer and data from the enhancement layer.

22. The client station of claim 21, wherein the first and second parts are received over different respective first and second links.

23. The client station of claim 21, wherein the first service resource is a first server and the second service resource is a second server.

24. The client station of claim 23, wherein the first server is a first wireless communication system base station and the second server is a second wireless communication system base station.

25. The client station of claim 21, wherein the multimedia stream is digitally broadcast.

26. The client station of claim 21, wherein the first service resource is a first trunk line and the second service resource is a second trunk line.

27. The client station of claim 21, wherein the first service resource is a satellite and the second service resource is a terrestrial resource.

28. The client station of claim 21, wherein the base layer of the multimedia stream represents a minimum amount of data necessary to render a frame of the multimedia stream.

29. The client station of claim 28, wherein the enhancement layer of the multimedia stream provides increased bit rate to add to the fidelity of the image or sound.

30. The client station of claim 21, wherein the one of image or sound data comprises image data, wherein the base layer and the enhancement layer represent image data in the multimedia stream, and wherein the enhancement layer adds quality to the base quality of the image data provided by the base layer.

31. The client station of claim 21, wherein the one of image or sound data comprises sound data, wherein the base layer and the enhancement layer represent sound data in the multimedia stream, and wherein the enhancement layer adds quality to the base quality of the sound data provided by the base layer.

32. A system, comprising:
first service provisioning means for providing a first part of a use case to a client station; and second service provisioning means, different from the first service provisioning means, for providing a second, different part of a use case to the client station simultaneous to the first service provisioning means providing the first part of the use case to the client station, the first and second parts not representing the same data as each other but collectively representing either image or sound data, wherein the first part is a base layer of a multimedia stream and the second part is an enhancement layer of the multimedia stream, wherein the multimedia stream includes at least one of image or sound, wherein the base layer and the enhancement layer collectively represent one, but not both, of image or sound data in the multimedia stream, and wherein the second part adds fidelity to the first part to provide additional quality to a base quality of the respective one of image or sound data provided by the base layer, wherein the base layer represents an amount of data to render a frame of the multimedia stream with the base quality, and wherein the at least one client station overlays the enhancement layer onto the base layer to establish frames of the multimedia stream with the additional quality, each frame including data from the base layer and data from the enhancement layer.

33. The system of claim 32, wherein the first and second service provisioning means are first and second trunk lines, respectively.

34. The system of claim 32, wherein the first service provisioning means is a first server and the second service provisioning means is a second server.

35. The system of claim 34, wherein the first server is a first wireless communication system base station and the second server is a second wireless communication system base station.

36. The system of claim 32, wherein the multimedia stream is digitally broadcast.

37. The system of claim 32, wherein the first service provisioning means is a satellite and the second service provisioning means is a terrestrial provisioning means.

38. The system of claim 32, wherein the base layer of the multimedia stream represents a minimum amount of data necessary to render a frame of the multimedia stream.

39. The system of claim 38, wherein the enhancement layer of the multimedia stream provides increased bit rate to add to the fidelity of the image or sound.

40. The system of claim 32, wherein the one of image or sound data comprises image data, wherein the base layer and the enhancement layer represent image data in the multimedia stream, and wherein the enhancement layer adds quality to the base quality of the image data provided by the base layer.

41. The system of claim 32, wherein the one of image or sound data comprises sound data, wherein the base layer and the enhancement layer represent sound data in the multimedia stream, and wherein the enhancement layer adds quality to the base quality of the sound data provided by the base layer.

42. A system comprising:
at least a first service node;
at least a second service node different from the first service node;
means for communicating base layer data of a multimedia stream to a client station via the first service node; and
means for simultaneously communicating enhancement layer data of the multimedia stream to the client station via the second service node,
wherein the multimedia stream includes at least one of image or sound, wherein the base layer data and the enhancement layer data collectively represent one, but not both, of image or sound data in the multimedia stream, and wherein the enhancement layer data adds quality to a base quality of the respective one of image or sound data provided by the base layer data,
wherein the base layer represents an amount of data to render a frame of the multimedia stream with the base quality, and wherein the at least one client station overlays the enhancement layer onto the base layer to establish frames of the multimedia stream with the additional quality, each frame including data from the base layer and data from the enhancement layer.

43. The system of claim 42, wherein the base layer data of the multimedia stream represents a minimum amount of data necessary to render a frame of the multimedia stream.

44. The system of claim 43, wherein the enhancement layer data of the multimedia stream provides increased bit rate to add to fidelity of the image or sound.

45. The system of claim 42, wherein the one of image or sound data comprises image data, wherein the base layer data and the enhancement layer data represent image data in the multimedia stream, and wherein the enhancement layer data adds quality to the base quality of the image data provided by the base layer data.

46. The system of claim 42, wherein the one of image or sound data comprises sound data, wherein the base layer data and the enhancement layer data represent sound data in the multimedia stream, and wherein the enhancement layer data adds quality to the base quality of the sound data provided by the base layer data.

47. A method comprising:
communicating base layer data of a multimedia stream to a client station via a first service node; and
simultaneously communicating enhancement layer data of the multimedia stream to the client station via a second, different service node,
wherein the multimedia stream includes at least one of image or sound, wherein the base layer data and the enhancement layer data collectively represent one, but not both, of image or sound data in the multimedia stream, and wherein the enhancement layer data adds quality to a base quality of the respective one of image or sound data provided by the base layer data,
wherein the base layer represents an amount of data to render a frame of the multimedia stream with the base quality, and wherein the at least one client station overlays the enhancement layer onto the base layer to establish frames of the multimedia stream with the additional quality, each frame including data from the base layer and data from the enhancement layer.

48. The method of claim 47, wherein the base layer data of the multimedia stream represents a minimum amount of data necessary to render a frame of the multimedia stream.

49. The method of claim 48, wherein the enhancement layer data of the multimedia stream provides increased bit rate to add to fidelity of the image or sound.

50. The method of claim 47, wherein the one of image or sound data comprises image data, wherein the base layer data and the enhancement layer data represent image data in the multimedia stream, and wherein the enhancement layer data adds quality to the base quality of the image data provided by the base layer data.

51. The method of claim 47, wherein the one of image or sound data comprises sound data, wherein the base layer data and the enhancement layer data represent sound data in the multimedia stream, and wherein the enhancement layer data adds quality to the base quality of the sound data provided by the base layer data.

52. A system comprising:
at least a first service node; and
at least a second service node different from the first service node,
wherein the first service node communicates base layer data of a multimedia stream to a client station, the second service node simultaneously communicates enhancement layer data of the multimedia stream to the client station, the multimedia stream includes at least one of image or sound, wherein the base layer data and the enhancement layer data collectively represent one, but not both, of image or sound data in the multimedia stream, and wherein the enhancement layer data adds quality to a base quality of the respective one of image or sound data provided by the base layer data, wherein the base layer represents an amount of data to render a frame of the multimedia stream with the base quality, and wherein the at least one client station overlays the enhancement layer onto the base layer to establish frames of the multimedia stream with the additional quality, each frame including data from the base layer and data from the enhancement layer.

53. The system of claim 52, wherein the base layer data of the multimedia stream represents a minimum amount of data necessary to render a frame of the multimedia stream.

54. The system of claim 53, wherein the enhancement layer data of the multimedia stream provides increased bit rate to add to fidelity of the image or sound.

55. The system of claim 52, wherein the one of image or sound data comprises image data, wherein the base layer data and the enhancement layer data represent image data in the multimedia stream, and wherein the enhancement layer data adds quality to the base quality of the image data provided by the base layer data.

56. The system of claim 52, wherein the one of image or sound data comprises sound data, wherein the base layer data and the enhancement layer data represent sound data in the multimedia stream, and wherein the enhancement layer data adds quality to the base quality of the sound data provided by the base layer data.

\* \* \* \* \*